Sept. 25, 1951 C. A. BROWN 2,569,285
MEANS FOR METERING FLUID
Filed July 20, 1944 2 Sheets-Sheet 1
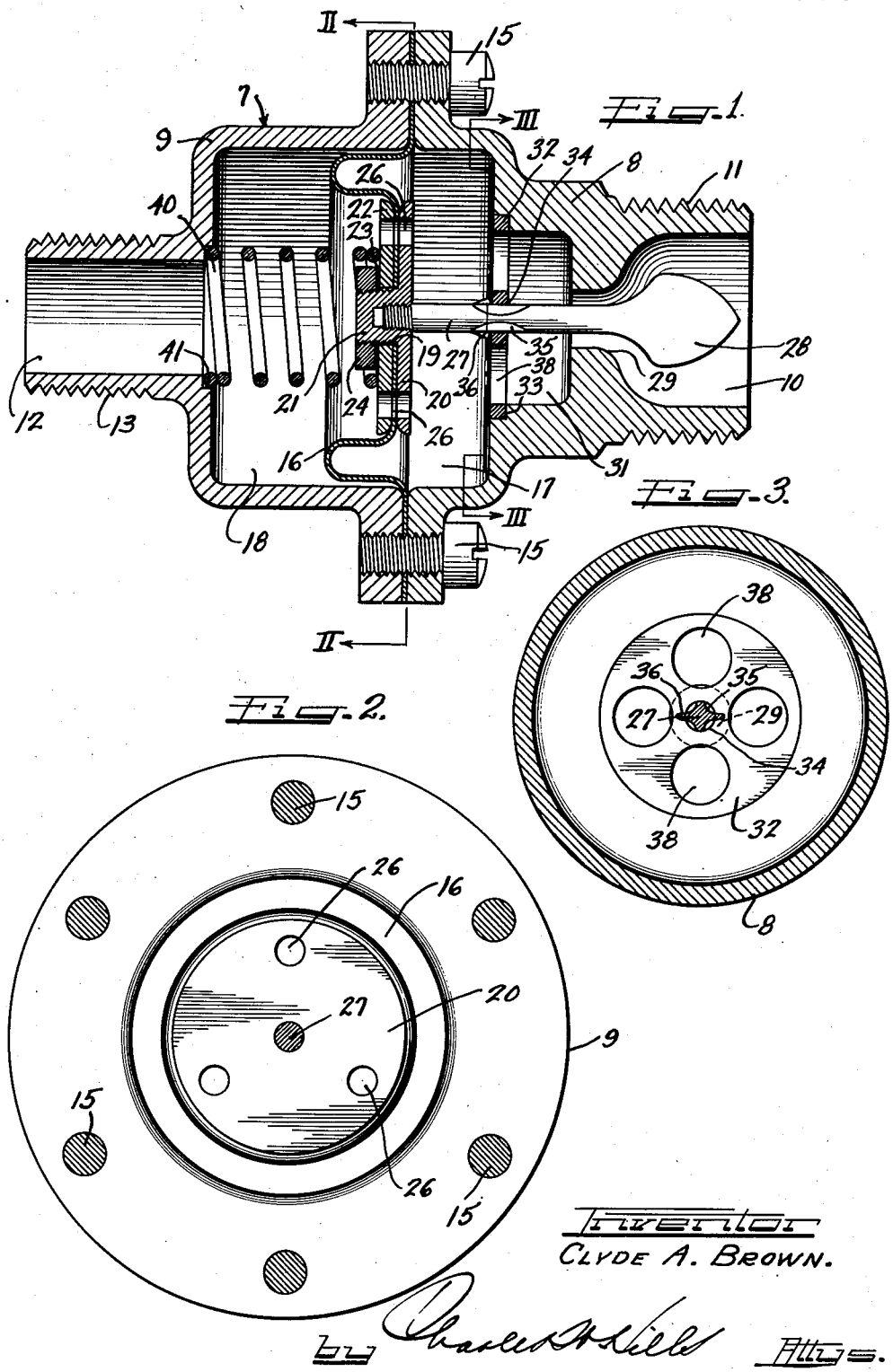
Inventor
CLYDE A. BROWN.

Sept. 25, 1951  C. A. BROWN  2,569,285
MEANS FOR METERING FLUID
Filed July 20, 1944  2 Sheets-Sheet 2
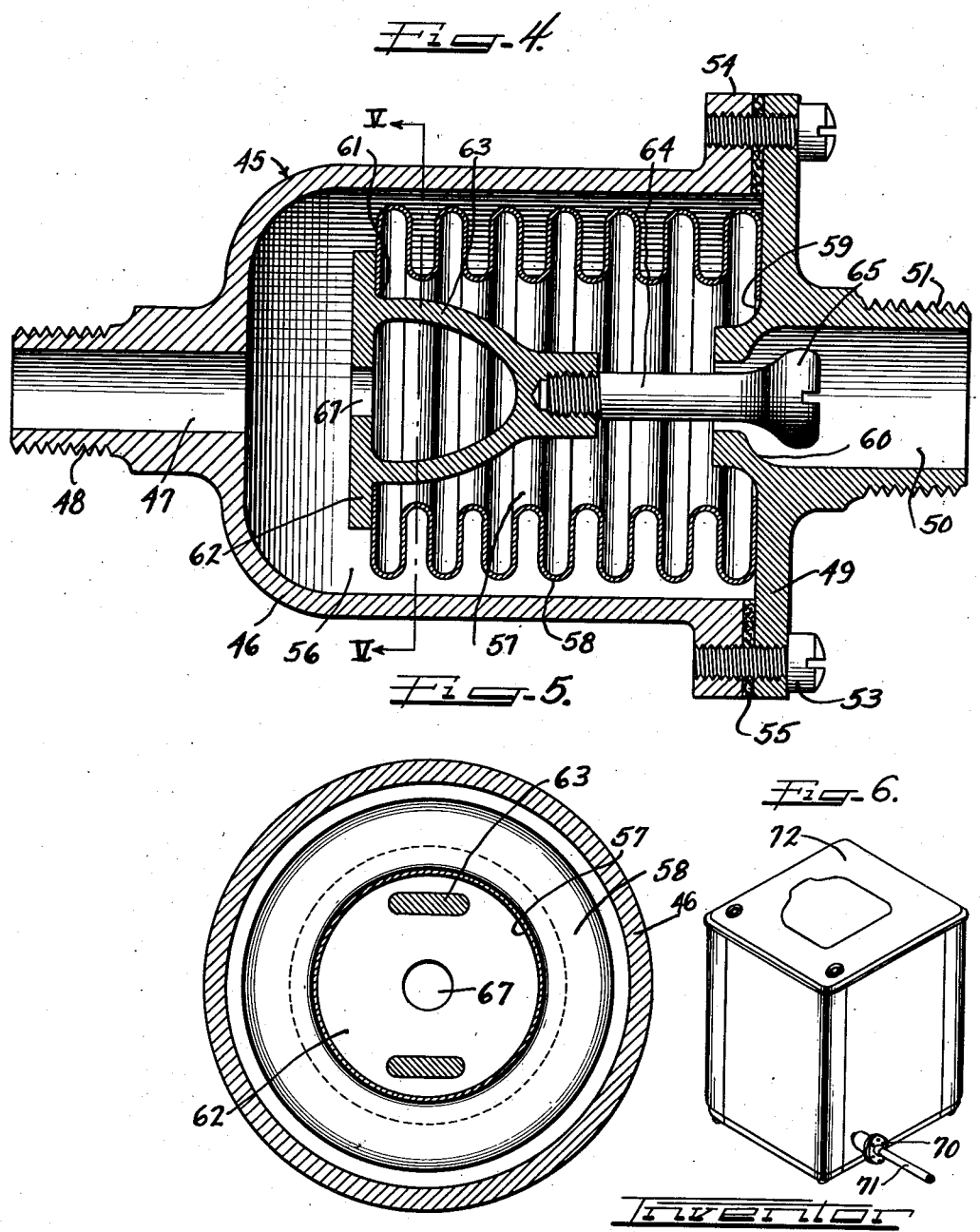

Patented Sept. 25, 1951

2,569,285

UNITED STATES PATENT OFFICE 2,569,285

MEANS FOR METERING FLUID

Clyde A. Brown, Chicago, Ill., assignor to The Dole Valve Company, Chicago, Ill., a corporation of Illinois Application July 20, 1944, Serial No. 545,875

1 Claim. (Cl. 137—152.5)

This invention relates to a method of and means for metering fluid. More particularly, the invention is concerned with a device for controlling the flow of fluid in a conduit or the like.

It is an object of the present invention to provide means for supplying a substantially constant flow of fluid from a supply source to a storage chamber or the like, such, for example, as furnishing water to an automatic washing machine.

It is the purpose of the present invention to provide in a fluid system control means which, when included in the system, will respond to pressure differentials existing between parts of the system to maintain the flow of liquid at the downstream side of said control means substantially constant for any one definite pressure in the sysem on the upstream side of said control means.

It is another object of this invention to provide control means for a fluid system which will maintain the variation in discharge quantities on the downstream side of said control means within a relatively small range, such as ten percent variation, when the pressures on the upstream side vary within a predetermined range.

It is a further object of the present invention to provide a metering or flow control device to accomplish this purpose which is both simple and efficient, yet economical to manufacture.

It is a still further object of the present invention to provide a metering device having an internally disposed flexible diaphragm which reacts instantly to pressure differentials within the structure of the device to regulate the flow of fluid and thus to insure a substantially constant output therefrom.

The present invention also contemplates a metering device characterized by a housing having an internal chamber, an inlet and an outlet therefor, a flexible means disposed in the chamber between the inlet and outlet, an opening in the flexible means, and adjustable means associated with the flexible means for controlling the passage of fluid through the chamber.

In accordance with still other general features of the present invention, there is provided in a metering device of the type to which the invention relates a flexible diaphragm with which is associated a means of varying the size of the orifice openings which supply fluid to the metering device.

Other objects and advantages of the present invention will be readily apparent from the descriptions of certain embodiments of the invention illustrated in the accompanying drawings, in which:

Figure 1 represents a vertical cross-section through a typical metering device which embodies the principles of the present invention;

Figure 2 is a cross-section through the device of Figure 1 as seen from the line II—II;

Figure 3 is a cross-section through the device of Figure 1 as seen from the line III—III.

The metering or flow control device illustrated in Figure 1 of the drawings embodies a housing 7 which comprises two castings 8 and 9. The casting 8 of housing 7 is provided with an inlet port 10 with which is associated a male thread 11 for securing the unit to a suitable supply conduit or the like. The casting 9 has an outlet port 12 which is also threaded about its external periphery as at 13 for connection with a suitable conduit or the like.

Disposed between the two castings 8 and 9 of housing 7 which are secured together as by means of the bolts 15 is a flexible membrane or diaphragm 16. This diaphragm 16, which is of the so-called envelope type, serves not only as a gasket to prevent leakage between the castings 8 and 9 when they are assembled, but also to divide the interior of the housing 7 into inlet chamber 17 and outlet chamber 18 which are so designated by reason of their association with inlet port 10 and outlet port 12, respectively. It will be readily understood that the diaphragm 16 may be fabricated of any suitable metal alloy, rubber, or a suitable moldable synthetic non-metallic plastic material.

The diaphragm 16, the convolution of which is substantially annular in shape and located adjacent to the wall of the casting 9, is provided with a centrally disposed circular aperture 19 therein. A disk member 20 is disposed adjacent the face of the diaphragm 16 within the inlet chamber 17 and is provided with a threaded hub portion 21 which extends through the aperture 19 in the diaphragm 16 into the outlet chamber 18. Adjacent the face of the diaphragm 16 disposed in the outlet chamber 18 and registering with the hub portion 21 of the disk member 20 is a ring 22. The ring 22 is fastened in place against the disk member 20 so as to hold the diaphragm 16 tightly therebetween by any suitable means, such, for example, as a washer 23 and a member 24 threaded upon the end of the hub portion 21.

A plurality of openings 26 are provided in the diaphragm assembly comprising the ring 22, diaphragm 16 and disk member 20 so as to communicate with inlet chamber 17 and outlet chamber 18. The openings 26 are advantageously disposed in annularly spaced relation around the central aperture 19 in the diaphragm 16. A stem 27 is disposed in substantially perpendicular relation with respect to the face of disk member 20 and is secured to said disk member 20 in any suitable fashion, such, for example, as by being threaded thereinto.

The stem 27 extends through the inlet chamber 17 and into the inlet port 10 being provided at its outermost end with a head 28 so shaped that it is adapted to form an obstruction for the orifice opening 29 in the base of the inlet port 10. Opening into the inlet chamber 17 and connecting with the orifice opening 29 for the inlet port 10 is a recess 31. A bearing plate 32 is disposed transversely of the longitudinal axis of the stem 27 and mounted in a counterbore 33 adjacent the open end of the recess 31.

The bearing plate 32 is provided with a central hole 34 in which the stem 27 is slidably supported for movement in an axial direction. The stem 27 is provided in its periphery adjacent the plate 32 with a plurality of milled slots 35 which serve to reduce the frictional resistance between the stem 27 and the hole 34 in the bearing plate 32. A plurality of raised portions or stops 36 are provided upon the stem 27 for contacting the face of the bearing plate 32 adjacent the inlet chamber 17 to delimit the movement of the stem 27 to the right as seen in Figure 1.

A plurality of circular openings 38 are provided in the bearing plate 32 and arranged in annularly spaced relation about the hole 34 therein. It is advantageous to provide a number and size of openings 38 such that the bearing plate 32, which is primarily intended to guide the stem 27, does not appreciably affect the flow of fluid from the orifice opening 29 into the inlet chamber 17.

A compression spring 40 is disposed in the outlet chamber 18 and on the opposite side of the diaphragm 16 from the stem 27. One end of the spring 40 is positioned against the face of the ring 22 and is adapted to encircle the member 24 which is threaded upon the hub portion 21 of the disk member 20 so as to prevent the possibility of displacement of the end of the spring 40 adjacent the diaphragm 16. The other end of the spring 40 is positioned in any suitable fashion in the outer wall of the outlet chamber 18, such, for example, as by causing the same to register with a counterbore 41 in the inlet port 12 of the casting 9.

The spring 40 is adapted to provide sufficient compression to position the diaphragm 16 and the disk member 20 in such fashion that the stem 27 carried by the latter will be in the position illustrated in Figure 1, that is, with the stops 36 against the face of the bearing plate 32 so as to just balance the lowest fluid pressure expected to be encountered on the upstream side of the metering device. Thus, the normal inoperative position for the stem 27 will be with the stops 36 thereof against bearing plate 32.

By way of explanation of the operation of the flow control device of the present invention, it will be assumed that the device is inserted in a conduit carrying water or other suitable fluid medium with the inlet port 10 connected to the upstream side of the conduit and the outlet port 12 connected to the downstream side thereof. When the system is not in operation, it will be understood that the stops 36 on the stem 27 will be positioned as shown in Figure 1 of the drawings abutting against the face of the bearing plate 32.

When a flow condition exists in the system into which the device is connected, by virtue of a pressure drop across the openings 26, a pressure differential is created between inlet chamber 17 and outlet chamber 18 of the flow control device. This pressure differential develops a force which exceeds the force exerted by the spring 40 against the under side of the diaphragm assembly including the ring 22, diaphragm 16 and disk member 20. Since the force on the diaphragm created by the pressure of the water acting on its opposite sides 17 exceeds the force of the spring 40, the diaphragm assembly including ring 22, diaphragm 16 and disk member 20 moves toward the outlet port 12 in the casting 9 or toward the downstream side of the system.

This movement of the disk member 20 causes the stem 27 mounted thereon to move toward the left as seen in Figure 1 with the result that the head 28 thereof tends to obstruct the orifice opening 29 of the inlet 10 thereby closing off a portion of the water entering through the inlet port 10 to the inlet chamber 17. This operation takes place only during such time as it is required to reduce the pressure drop across the openings 26 and, in turn, to reduce the total pressure differential between the outlet chamber 18 and the inlet chamber 17 to the point where the force created by this pressure differential is balanced by the force exerted by the spring 40 against the diaphragm assembly including ring 22, diaphragm 16 and disk member 20.

In this invention the control device may be designed to respond to pressure differentials caused by any one of a range of pressures on the upstream side of the inlet chamber. For example, the device may be designed for a range of inlet pressures of from 15 to 150 pounds per square inch and be arranged for insertion in a fluid system with the downstream side controlled by a faucet and the upstream side subjected to the inlet pressure. If, then, the faucet is opened, a pressure differential will exist between the upstream side of the device and the downstream side. This pressure differential will cause the diaphragm assembly to move in the housing toward the downstream side thereof and will, due to the restricting action of the metering head 28, assume a position in which the pressure in the chamber 17 is substantially constant, with the differential pressure just balancing the force exerted on the diaphragm by the spring.

It is evident that whether the inlet pressure be 15 or 150 pounds per square inch there will be a pressure differential set up when the faucet is open. In each of these extreme cases, the movement of the diaphragm will of course be different since it will require more throttling at the orifice opening 29 to reduce the 150 pounds per square inch pressure than it will to reduce the 15 pounds per square inch pressure. However, in both of these cases the diaphragm will attain a position at which the differential pressure just balances the force exerted by the spring 40. Further, due to the fact that increased throttling will cause increased velocity through the orifice opening, the velocity of liquid through the fixed opening 26 in the diaphragm will tend to be greater in the case of about 150 pounds per square inch inlet pressure than it will be in the case of the 15 pounds per square inch inlet pressure and, therefore, the discharge quantity will be somewhat greater. The discharge variation due to the greater velocity should be approximately ten percent. Therefore, the control device of this invention is adapted to maintain a substantially constant discharge flow for any one constant inlet pressure. Also, it is adapted to maintain the discharge flow within a narrow range when the inlet pressures vary over a relatively wide range.

It will, of course, be understood that various details of construction may be varied through a wide range without departing from the principles of this invention, and it is, therefore, not the purpose to limit the patent granted hereon otherwise than necessitated by the scope of the appended claim.

I claim as follows:

In combination in a metering device of the character described, means providing an inlet orifice, means defining an inlet chamber at the delivery side of said orifice, a stem extending through said orifice having a metering head cooperative with the entrance side of the orifice, means providing an outlet chamber positioned on the down stream side of said inlet chamber, orifice means connecting said inlet and outlet chambers, means adapted to fluctuate due to pressure differential between said inlet and said discharge chambers on the flow axis of the device connected to the inner end of said stem, a spring acting on said fluctuating means to hold said stem in a position wherein the pressure differential between said inlet chamber and said outlet chamber will remain substantially constant, means for guiding said stem to maintain the latter in proper axial position within the orifice, said guide means being located in said inlet chamber and spaced between said inlet orifice and said fluctuating means, and means on said stem cooperable with said guiding means to limit the extent to which the stem may be moved under the influence of said spring.

CLYDE A. BROWN.

REFERENCES CITED

The following references are of record in the file of this patent:

UNITED STATES PATENTS

| Number | Name | Date |
|---|---|---|
| 316,626 | Jackson | Apr. 28, 1885 |
| 375,071 | Jackson | Dec. 20, 1887 |
| 920,716 | Beckman | May 4, 1909 |
| 1,044,053 | Huxford | Nov. 12, 1912 |
| 1,495,101 | Oldham | May 20, 1924 |
| 2,321,573 | Chace | June 15, 1943 |

FOREIGN PATENTS

| Number | Country | Date |
|---|---|---|
| 15,083 | Great Britain | of 1898 |
| 18,825 | Germany | of 1882 |

OTHER REFERENCES

Ser. No. 243,016, V. Bayerl (A. P. C.), published May 11, 1943.